United States Patent [19]
Meckel et al.

[11] Patent Number: 5,115,073
[45] Date of Patent: * May 19, 1992

[54] RAPIDLY CRYSTALLIZING POLYURETHANE SYSTEMS

[75] Inventors: Walter Meckel, Neuss; Eduard Hänsel, Wuppertal-Elberfeld; Güter Arend, Dormagen; Klaus König, Odenthal, all of Fed. Rep. of Germany

[73] Assignee: Bayer Aktiengesellschaft, Leverkusen Bayerwerk, Fed. Rep. of Germany

[*] Notice: The portion of the term of this patent subsequent to Aug. 7, 2007 has been disclaimed.

[21] Appl. No.: 580,717

[22] Filed: Sep. 11, 1990

[30] Foreign Application Priority Data

Sep. 23, 1989 [DE] Fed. Rep. of Germany ....... 3931845

[51] Int. Cl.⁵ ............................................. C09J 3/14
[52] U.S. Cl. ...................................... 528/83; 528/80; 521/126; 521/137; 521/138; 521/163; 521/172
[58] Field of Search ............... 528/83, 80; 521/126, 521/137, 138, 163, 172

[56] References Cited

U.S. PATENT DOCUMENTS

| | | | |
|---|---|---|---|
| 3,951,919 | 4/1976 | Pinfold | 528/67 |
| 4,663,417 | 5/1987 | Hunter et al. | 528/80 |
| 4,798,851 | 1/1989 | Werner et al. | 521/137 |
| 4,814,419 | 3/1989 | Cotter et al. | 528/174 |
| 4,946,535 | 8/1990 | Meckel et al. | 528/83 |

FOREIGN PATENT DOCUMENTS

| | | |
|---|---|---|
| 340906 | 11/1989 | European Pat. Off. . |
| 344912 | 12/1989 | European Pat. Off. . |
| 1540634 | 2/1979 | United Kingdom . |

*Primary Examiner*—John Kight, III
*Assistant Examiner*—Duc Truong
*Attorney, Agent, or Firm*—Joseph C. Gil; Godfried R. Akorli

[57] ABSTRACT

The present invention is directed to a polyurethane system containing isocyanate groups prepared by reacting A) 70 to 98 parts by weight of at least one polyester diol having a melting point of 30° C. to 60° C. and a molecular weight of 800 to 8,000, B) 2 to 30 parts by weight of at least one polyester diol having a melting point of 65° C. to 150° C. and a molecular weight of 600 to 8,000, and C) no more than 1 mole of a diol having a molecular weight of less than 600 per moles of A) plus B), with, D) at least one organic polyisocyanate, the ratio of isocyanate groups to hydroxyl groups is between 3:1 and 1.2:1.

9 Claims, 1 Drawing Sheet

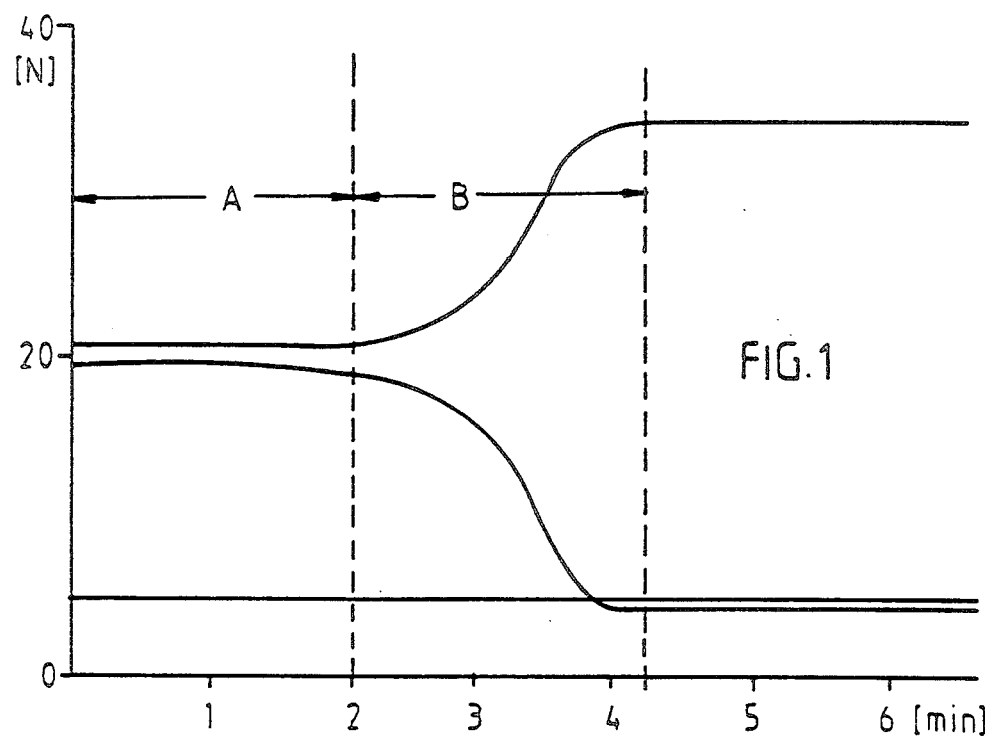
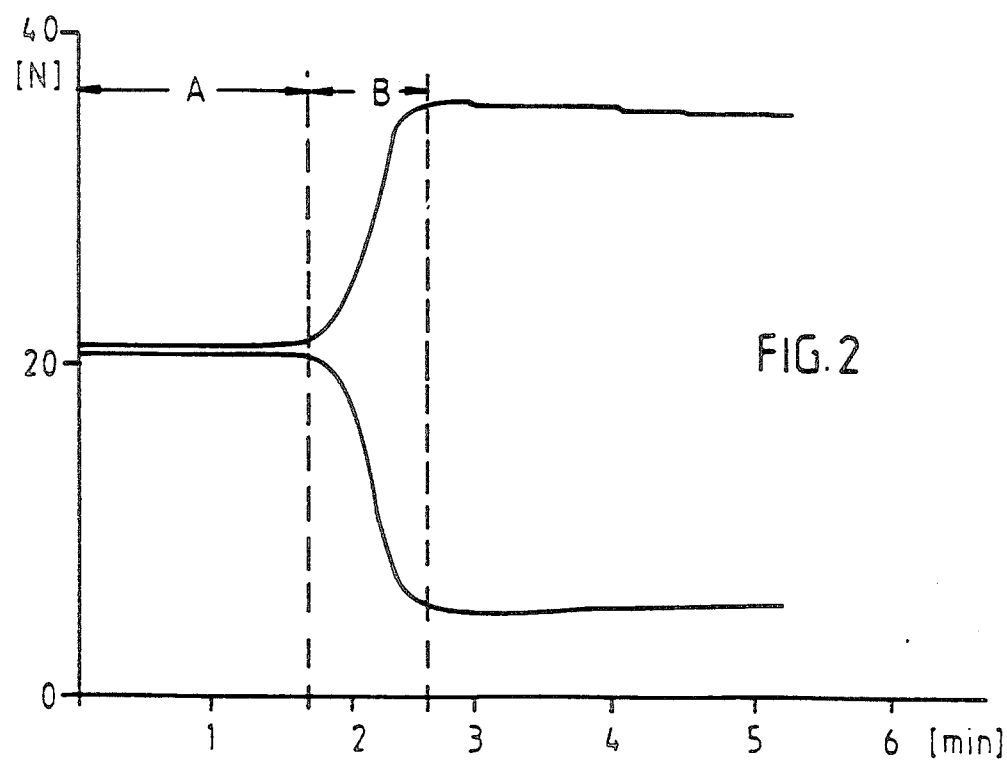

RAPIDLY CRYSTALLIZING POLYURETHANE SYSTEMS

BACKGROUND OF THE INVENTION

The present invention relates to polyurethane systems based on polyisocyanates and at least two polyesters having different melting points and to a process for bonding substrates using the polyurethane systems according to the invention.

Hotmelt adhesives are known. Their advantages are that, applied as hot melts, they solidify quickly on cooling and hence build up strength. Their disadvantages are that, due to the high melting temperatures, heat sensitive substrates are difficult to bond and the bonds soon lose strength with increasing temperature due to the thermoplastic character of the polymers.

An elegant means of building up the properties of hotmelts, namely strength on cooling, while at the same time facilitating application at low temperatures to form bonds of high heat resistance are the reactive hotmelt systems based on isocyanate-containing prepolymers of diisocyanates and polyester diols with melting ranges above 40° C. which are described in German patent 878,827 and Auslegeschrift 2,609,266. Due to their low molecular weight, the products are liquid and can be applied at temperatures just above the melting range of the polyesters and, through recrystallization, develop increased initial strengths and ultimate strengths by reaction of the free isocyanate groups with, for example, atmospheric moisture to form linear polyurethane polyureas of high molecular weight.

Since systems such as these, despite their low molecular weight, are intended to build up a certain strength immediately after application of the melt, crystalline polyesters are absolutely essential to the composition of the hotmelts. Particularly suitable crystalline polyesters are the polyesters based on aliphatic dicarboxylic acids containing an even number of carbon atoms, such as for example adipic acid, sebacic acid or dodecanedioic acid, and diols, such as for example butane or hexane diol. The melting points and crystallization rate of the polyesters and, hence, of the hotmelts increase with increasing chain length of the dicarboxylic acids and the diols.

However, it has been found that systems based on very rapidly crystallizing polyesters, for example polyesters based on dodecanedioic acid and hexane-1,6-diol, lead to very brittle products, so that there are limits to a desirable increase in initial strength by rapid crystallization. There has been no shortage of attempts to overcome these disadvantages. Thus, according to European patent 107,097 for example, high molecular weight polymers are added to the isocyanate-containing prepolymers to increase initial strength. However, products such as these can only be compounded with considerable effort using expensive machines, such as planetary mixers or extruders, because the viscosity of the systems increases to a considerable extent. In many cases, compounding in this way also has an adverse effect on stability in storage.

The problem addressed by the present invention was to provide polyurethane systems characterized by rapid crystallization, high flexibility after crystallization and good curing.

BRIEF DESCRIPTION OF THE DRAWINGS

FIGS. 1 and 2 represent graphs plotting shear force versus time for Examples 10a and 11.

DESCRIPTION OF THE INVENTION

The present invention is directed to polyurethane systems containing isocyanate groups prepared by reacting:

A) 70 to 98 parts by weight of at least one polyester diol having a melting point of 30° C. to 60° C. and a molecular weight of a 800 to 8,000, B) 2 to 30 parts by weight of at least one polyester diol having a melting point of 65° C. to 150° C. and a molecular weight of 600 to 8,000, and C) no more than 1 mol of a diol having a molecular weight of less than 600 per mole of A) plus B), with D) at least one organic polyisocyanate, with the ratio of isocyanate groups to hydroxyl groups being between 3:1 and 1.2:1.

The present invention also relates to a process for the bonding of substrates using the polyurethane systems according to the invention, preferably as hotmelt adhesives.

It has surprisingly been found that the crystallization rate of the systems can be greatly accelerated by addition of small quantities of high-melting polyester polyols B) without their properties as a whole being adversely affected. Behavior such as this had not been in any way expected because mixtures of crystalline components normally crystallize more slowly and at lower temperatures than the pure components of the mixture, particularly if one of the components is present in only a small quantity.

Suitable polyester diols A) having a melting range of 30° C. to 60° C. and preferably 50° C. to 60° C. and molecular weights in the range from 800 to 8,000 and preferably in the range from 1,500 to 6,000 are, essentially, polyester diols based on carbonic acid or dicarboxylic acids, such as for example succinic acid, adipic acid, suberic acid, azelaic acid, and diols, such as for example ethylene glycol, butane-1,4-diol and hexane-1,6-diol; preferred acids being adipic acid and carbonic acid and preferred diols being butanediol and hexanediol. Polyesterdiols based on hydroxycarboxylic acids, particularly 6-hydroxycaproic acid, or reaction products of diols with ε-caprolactone are also preferred. Small quantities of other diols and/or dicarboxylic acids may also be used providing the melting range of the polyesters, as defined by the endothermy maximum in differential thermoanalysis, is between 30° C. and 60° C., preferably between 40° C. and 60° C. and, more preferably between 50° C. and 60° C. for a heating rate of 5° C. per minute.

Suitable polyesters B) having a melting range of 65° C. to 150° C. and preferably 70° C. to 145° C., again as defined by the endothermy maximum in differential thermoanalysis, are in particular polyesters based on i) adipic acid, suberic acid or o carbonic acid and decane or dodecane diol or octane, decane or ii) dodecanedioic acid with butane-1,4-diol, hexane-1,6-diol, octane-1,8-diol, decane-1,10-diol or dodecane-1,12-diol or iii) terephthalic acid and hexane-1,6-diol or dodecane-1,12-diol. The molecular weights are preferably in the range from 800 to 6,000. Polyesterdiols B) based on dodecanedioic acid and hexane-1,6-diol having a molecular weight of 1,500 to 5,000 or on terephthalic acid and hexane-1,6-diol having a molecular weight of 800 to 3,000 are particularly preferred.

The polyesters may be produced in known manner by melt condensation of the dicarboxylic acids with an excess of the diol component at temperatures in the range from 180° C. to 280° C. Catalysts or entraining agents, such as toluene for example, may of course also be used.

The polyesters may of course also be produced by transesterification of dicarboxylic acid esters with diols, such as for example terephthalic acid dimethyl ester with hexane-1,6-diol. The carbonic acid esters are preferably obtained by transesterification of carbonic acid esters, such as for example diphenyl carbonate or carbonic acid diphenyl ester, and an excess of diols.

In one preferred embodiment, diols C having a molecular weight of less than 600 and preferably less than 400 are used as chain extending agents. These relatively low molecular weight diols are preferably used in a quantity of at most 1 mole C) per mole A) plus B). Suitable low molecular weight diols optionally used include, in particular, di-, tri- and/or tetraethylene glycol, 1,4-dimethylol cyclohexane or reaction products of 4,4'-hydroxyphenyl propane with ethylene and/or propylene oxide. For special effects, it is of course also possible to use diols containing ions and/or structural elements containing ionic groups, such as for example dimethylol propionic acid, N-methyl diethanolamine and/or reaction products of sodium bisulfite and propoxylated butene-1,4-diol.

Suitable polyisocyanates D) are, preferably difunctional isocyanates, such as for example hexamethylene diisocyanate, 4,4'-diisocyanatodicyclohexyl methane, tolylene diisocyanates, diphenyl methane diisocyanates and/or even methylsubstituted diphenyl methane diisocyanates, although it is preferred to use 4,4'-diphenyl methane diisocyanate with up to 80% 2,4' diphenyl methane diisocyanate.

The ratio of isocyanate reactive groups in A), B) and C) and the isocyanate groups in the polyisocyanates D) may be varied within wide limits. Generally, the ratio of isocyanate groups to isocyanate reactive groups should be from 3:1 to 1.2:1 and preferably from 2.3:1 to 1.4:1.

The polyurethane systems containing isocyanate groups may be produced, for example, by mixing the liquid polyesters A) and B) and, optionally, the low molecular weight diol C), mixing the resulting mixture with an excess of the polyisocyanate D) and packaging the homogeneous mixture or stirring it until a constant NCO value is obtained, followed by packaging. The reaction temperature is in the range from 60° C. to 150° C. and preferably in the range from 65° C. to 110° C. The reactive polyurethane systems may of course also be produced continuously in a cascade of stirred tanks or in suitable mixing units, for example in high-speed mixers on the rotor-stator principle.

However, A) and B) may also be separately reacted with the polyisocyanate and the prepolymers containing isocyanate groups subsequently mixed in the ratio according to the invention and packaged.

The polyesters A) and B) or a part thereof may of course be modified with a substoichiometric quantity of diisocyanates, preferably hexamethylene diisocyanate, and the urethane-containing polyester diols reacted on completion of the modification reaction with an excess of diisocyanates to form a hotmelt containing isocyanate groups.

The polyurethane systems will keep almost indefinitely providing they are stored in the absence of moisture at room temperature to 40° C. They may be modified with fillers, dyes, resins and/or extending oils and represent excellent adhesives.

The polyurethane systems are preferably applied at elevated temperature, being melted continuously or discontinuously at temperatures of 80° C. to 160° C. and the melts being applied to the substrates to be bonded.

The moisture in the substrates and atmospheric moisture are normally sufficient for setting, although the reaction may of course be accelerated by additional spraying with water and/or media containing polyols or catalysts.

The products may be widely used as adhesives, for example as assembly adhesives for the temporary fixing of components or even as bookbinding adhesives where an earlier buildup of strength is obtained through the rapid crystallization and provides for a fast cyclic time in conventional bookbinding machines.

Where the polyurethane systems according to the invention are used as adhesives, they are preferably melted and applied to at least one surface of the substrates to be bonded. The parts to be bonded may then be immediately fitted together under pressure. In one preferred embodiment, the molten system is applied to one surface of the substrates to be bonded. After a while, the other substrate is fitted to the adhesive-coated surface in preheated form under pressure and optionally with shaping.

The invention is further illustrated but is not intended to be limited by the following examples in which all parts and percentages are by weight unless otherwise specified.

EXAMPLES

"SP" stands for melting point as measured by differential thermoanalysis.

| Polyester polyols A): | |
|---|---|
| A-1 | Hydroxylpolyester of adipic acid and butane-1,4-diol<br>MW 2,250 hydroxyl value 49<br>SP: 52° C. |
| A-2 | Hydroxylpolyester of adipic acid and hexane-1,6-diol<br>MW 2,250 hydroxyl value 50<br>SP: 55° C. |
| A-3 | Hydroxylpolyester of adipic acid and hexane-1,6-diol<br>MW 5,000 hydroxyl value 22.5<br>SP: 57° C. |
| A-4 | Hydroxylpolyester of 2 mol polyester A-2 and 1 mol diisocyanate D-2<br>MW 4,600 hydroxyl value 24.5<br>SP: 56° C. |
| Polyester polyols B): | |
| B-1 | Hydroxylpolyester of dodecanedioic acid and hexane-1,6-diol<br>MW 2,000 hydroxyl value 57<br>SP: 72° C. |
| B-2 | Hydroxylpolyester of dodecanedioic acid and hexane-1,6-diol<br>MW 5,000 hydroxyl value 23<br>SP: 72° C. |
| B-3 | Hydroxylpolyester of dodecanedioic acid and hexane-1,6-diol<br>MW 1,000 hydroxyl value 110<br>SP: 66° C. |
| B-4 | Hydroxylpolyester of dodecanedioic acid and dodecanediol |

-continued

| | | |
|---|---|---|
| | MW 2,000 hydroxyl value 54 SP: 83° C. | |
| B-5 | Hydroxylpolycarbonate of dodecanediol MW 2,000 hydroxyl value 55 SP: 69° C. | |
| B-6 | Hydroxylpolyester of adipic acid and dodecanediol MW 2,000 hydroxyl value 57 SP: 76° C. | |
| B-7 | Hydroxylpolyester of terephthalic acid and hexane-1,6-diol MW 1,250 hydroxyl value 91 SP: 142° C. | |
| B-8 | Hydroxylpolyester of terephthalic and dodecanediol MW 2,000 hydroxyl value 57 SP: 120° C. | |
| B-9 | Hydroxylpolyester of dodecanedioic acid and dodecanediol MW 1,000 hydroxyl value 113 SP: 76° C. | |
| Diisocyanates | | |
| D-1 | 4,4'-Diisocyanatodiphenyl methane | |
| D-2 | Hexamethylene diisocyanate | |

Production of the polyurethane systems

The molten polyester polyols A) and B) are mixed and dehydrated with stirring for 60 minutes at 100° C. at about 20 mm/g. The diisocyanate is added at approximately 80° C. to 90° C. and the mixture is stirred under nitrogen until the isocyanate content is constant.

Investigation of the hotmelt systems

The polyurethane systems are melted after storage for two weeks at room temperature. The isocyanate content of the liquid polyurethane systems is determined by titration with dibutylamine. The liquid polyurethane system is applied to beechwood specimens and the curing characteristic, divided into a wetting phase A and crystallization phase B, is determined, cf. FIGS. 1 and 2.

To this end, the adhesive is subjected to a sinusoidal alternating shear stress in the gap between the materials to be bonded and the shear forces generated are continuously measured. The measured shear forces are shown as a function of time (in seconds), see FIGS. 1 and 2. The shear stress is applied by a frequency-controlled shear motor and a fine threaded spindle. The path amplitude is 200 and the load frequency 1 Hz. The gap between the substrates is 0.2 mm wide and the heating of the specimen clamping jaws is adjusted to 20±2° C. The test data are recorded over 10 minutes.

In addition, a 1,000 um thick film of the polyurethane is knife coated onto a glass plate and folded through 180 degrees after storage for 24 hours at room temperature and approx. 60 to 70% relative humidity. The result of the folding test is positive if the film withstands the test without breaking.

| Example | Compound A) (g) | Compound B) (g) | Compound D-1 (g) | NCO |
|---|---|---|---|---|
| 1 | 1,000 A-2 | 50 B-4 | 266 | 2.94 |
| 2 | 1,000 A-2 | 100 B-4 | 239 | 2.93 |
| 3 | 1,000 A-2 | 200 B-4 | 265 | 2.98 |
| 4 | 900 A-2 | 100 B-9 | 240 | 3.19 |
| 5 | 1,000 A-2 | 53 B-7 | 235 | 3.05 |
| 6 | 900 A-2 | 100 B-7 | 203 | 3.12 |
| 7 | 900 A-2 | 100 B-3 | 238 | 3.15 |
| 8 | 900 A-2 | 100 B-1 | 214 | 2.88 |
| 9 | 900 A-2 | 100 B-2 | 201 | 2.44 |
| 10 | 1,000 A-1 | 50 B-1 | 237 | 2.97 |
| 11 | 1,000 A-1 | 200 B-4 | 274 | 3.07 |

(see FIG. 2)

-continued

| Comparison | | | | |
|---|---|---|---|---|
| 1-a | 1,225 A-2 | — | 250 | 2.91 |
| 8-a | — | 1,000 B-1 | 250 | 3.30 |
| 10-a (see FIG. 1) | 1,110 A-1 | — | 250 | 2.90 |

| | Results | | |
|---|---|---|---|
| | Wetting | Crystallization | Folding test |
| 1 | 90 | 30 | — |
| 2 | 55 | 15 | + |
| 3 | 30 | 15 | + |
| 4 | 65 | 10 | + |
| 5 | 60 | 30 | + |
| 6 | 80 | 20 | + |
| 7 | 150 | 50 | + |
| 8 | 90 | 15 | + |
| 9 | 40 | 15 | + |
| 10 | 60 | 30 | + |
| 11 | 100 | 55 | + |
| Comparison | | | |
| 1-a | 80 | 90 | + |
| 8-a | 12 | 6 | — |
| 10-a | 130 | 125 | + |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane system containing isocyanate groups prepared by reacting:
   A) 70 to 98 parts by weight of at least one polyester diol having a melting point of 30° C. to 60° C. and a molecular weight of a 800 to 8,000,
   B) 2 to 30 parts by weight of at least one polyester diol having a melting point of 65° C. to 150°C. and a molecular weight of 600 to 8,000, and
   C) no more than 1 mole of a diol having a molecular weight of less than 600 per moles of A) plus B), with,
   D) at least one organic polyisocyanate, the ratio of isocyanate groups to hydroxyl groups is between 3:1 and 1.2:1.

2. The system of claim 1, wherein diol C) has a molecular weight below 400.

3. The system of claim 1 wherein the ratio of the isocyanate groups to isocyanate-reactive groups is from 2.2:1 to 1.4:1.

4. The system of claim 1 wherein 75 to 98% by weight of the mixture of A) and B) consists of hydroxylpolyesters of adipic acid and hexane-1,6-diol in a molecular weight range of 1,500 to 6,000.

5. The system of claim 1 wherein 2 to 15% by weight of the mixture of A) and B) consists of hydroxylpolyesters of terephthalic acid and hexane-1,6-diol in a molecular weight range of 800 to 2,500.

6. The system of claim 1 wherein 5 to 30% by weight of the mixture of A) and B) consists of hydroxylpolyesters of dodecanedioic acid and hexane-1,6-diol in a molecular weight range of 1,500 to 6,000.

7. The system of claim 1 wherein diphenyl methane diisocyanates are used as the polyisocyanate.

8. In a process for bonding substrates using a polyurethane system by applying said adhesive to at least one of the substrates to be bonded, bringing the substrates together, and allowing the adhesive to cure, the improvement wherein the adhesive is the system of claim 1.

9. The process of claim 8, wherein the polyurethane system is used in solvent-free form as a hotmelt adhesive.

* * * * *